(12) United States Patent
Bessettes et al.

(10) Patent No.: US 11,066,864 B2
(45) Date of Patent: Jul. 20, 2021

(54) LOCKING AND MOVING SYSTEM FOR AN AIRCRAFT ELECTRIC DOOR

(71) Applicant: LATECOERE, Toulouse (FR)

(72) Inventors: Cyrille Bessettes, Buzet sur Tarn (FR); Damien Buchet, Toulouse (FR); Nicolas Lutzi, Toulouse (FR); Renaud Othomene, Toulouse (FR)

(73) Assignee: Latecoeye, Toulouse (FR)

(*) Notice: Subject to any disclaimer, the term of this patent is extended or adjusted under 35 U.S.C. 154(b) by 0 days.

(21) Appl. No.: 16/266,432

(22) Filed: Feb. 4, 2019

(65) Prior Publication Data
US 2019/0169915 A1 Jun. 6, 2019

Related U.S. Application Data

(60) Continuation of application No. 15/728,888, filed on Oct. 10, 2017, now Pat. No. 10,240,383, which is a division of application No. 14/443,080, filed as application No. PCT/EP2013/003429 on Nov. 14, 2013, now Pat. No. 9,816,307.

(30) Foreign Application Priority Data

Nov. 16, 2012 (FR) ..................................... 1260893

(51) Int. Cl.
*E05F 15/70* (2015.01)
*B64C 1/14* (2006.01)
(Continued)

(52) U.S. Cl.
CPC ............ *E05F 15/70* (2015.01); *B64C 1/1407* (2013.01); *B64C 1/1423* (2013.01);
(Continued)

(58) Field of Classification Search
CPC ........... E05F 15/70; E05F 15/60; E05F 11/54; E05Y 2900/502; B64C 1/1423; B64C 1/1446; B64C 1/1407
See application file for complete search history.

(56) References Cited

U.S. PATENT DOCUMENTS

| | | | | |
|---|---|---|---|---|
| 4,447,026 | A | * | 5/1984 | Maraghe ............... B64C 1/1407 16/278 |
| 4,473,201 | A | * | 9/1984 | Barnes .................. B64C 1/1415 244/129.5 |

(Continued)

FOREIGN PATENT DOCUMENTS

CA 2322568 * 4/2001

*Primary Examiner* — Gregory J Strimbu
(74) *Attorney, Agent, or Firm* — DeFillo & Associates; Evelyn A DeFillo

(57) ABSTRACT

An aircraft electric door for a pressurized airframe having a locking system for locking a safety catch, a system for moving a door arm, and an electric motor activated by a door computer to actuate both systems. The system for moving the door arm includes a guideway linked to the door arm. The guideway is in a mobile cylindrical support rotated by the electric motor. A fixed guide is fitted in a cylindrical sleeve around the cylindrical support. The fixed guide includes a vertical camway and a horizontal camway. The door arm pivots around a vertical hinge and is linked with door lifting devices. The door lifting devices are mounted between a shaft of the safety catch and the door arm.

1 Claim, 12 Drawing Sheets

(51) Int. Cl.
 *E05F 15/40* (2015.01)
 *E05F 15/60* (2015.01)
 *E05F 11/54* (2006.01)

(52) U.S. Cl.
 CPC ............ *B64C 1/1446* (2013.01); *E05F 11/54* (2013.01); *E05F 15/40* (2015.01); *E05F 15/60* (2015.01); *E05Y 2900/502* (2013.01)

(56) References Cited

U.S. PATENT DOCUMENTS

| | | | | |
|---|---|---|---|---|
| 4,720,065 | A * | 1/1988 | Hamatani | B64C 1/1407 244/129.5 |
| 5,163,639 | A * | 11/1992 | Herrmann | B64C 1/1407 244/129.5 |
| 5,180,121 | A * | 1/1993 | Banks | B64C 1/1407 16/317 |
| 5,222,277 | A * | 6/1993 | Harvey | B64G 1/22 16/48.5 |
| 5,251,851 | A * | 10/1993 | Herrmann | B64C 1/143 244/129.5 |
| 5,305,969 | A * | 4/1994 | Odell | B64C 1/1407 244/129.5 |
| 6,116,542 | A * | 9/2000 | Erben | B64C 1/1407 244/129.5 |
| 9,816,307 | B2 * | 11/2017 | Bessettes | B64C 1/1407 |
| 2005/0235565 | A1 * | 10/2005 | Hoffmann | B64C 1/1407 49/334 |
| 2009/0108133 | A1 * | 4/2009 | Clausen | B64C 1/1407 244/129.1 |
| 2013/0318873 | A1 * | 12/2013 | Knijnenburg | B64C 1/1407 49/31 |

* cited by examiner

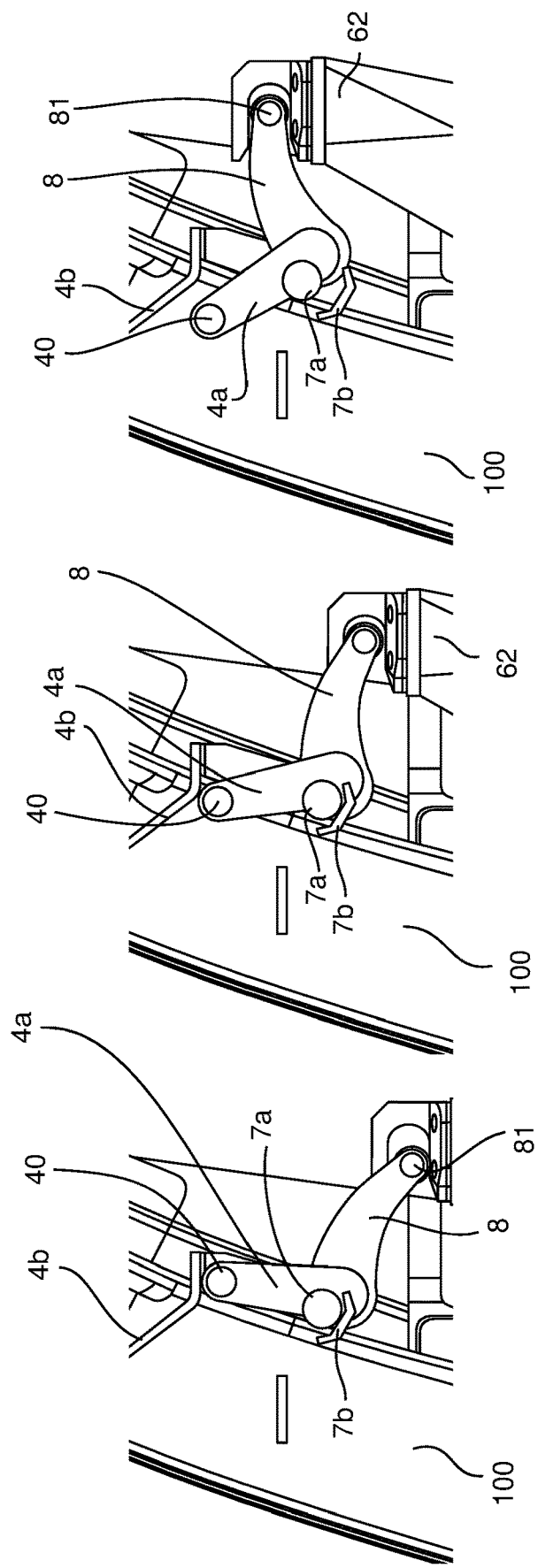

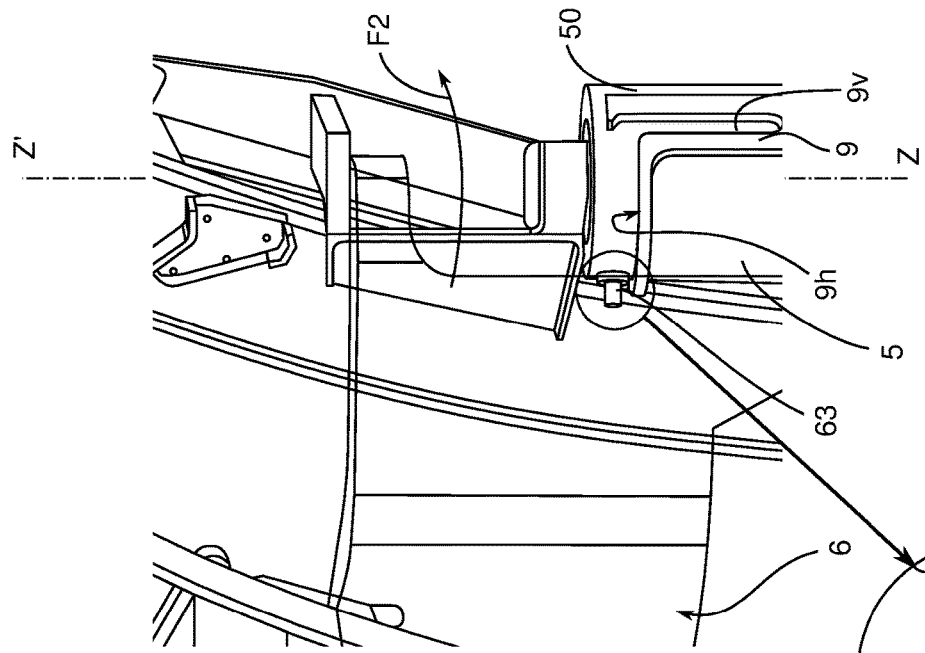
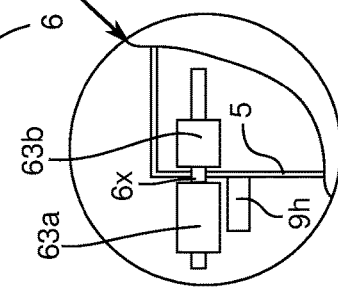
Figure 5c
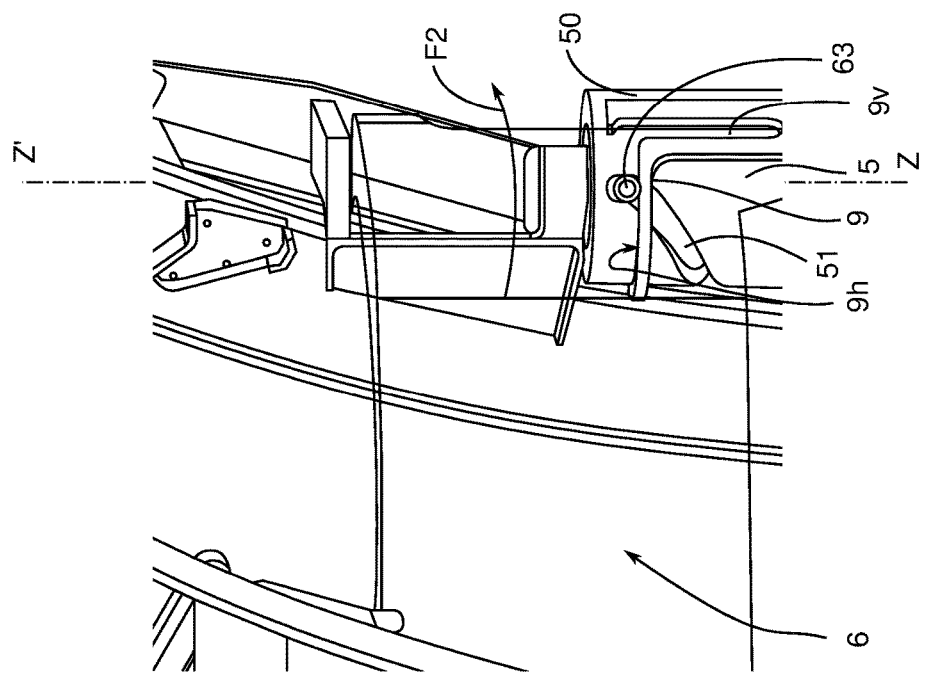

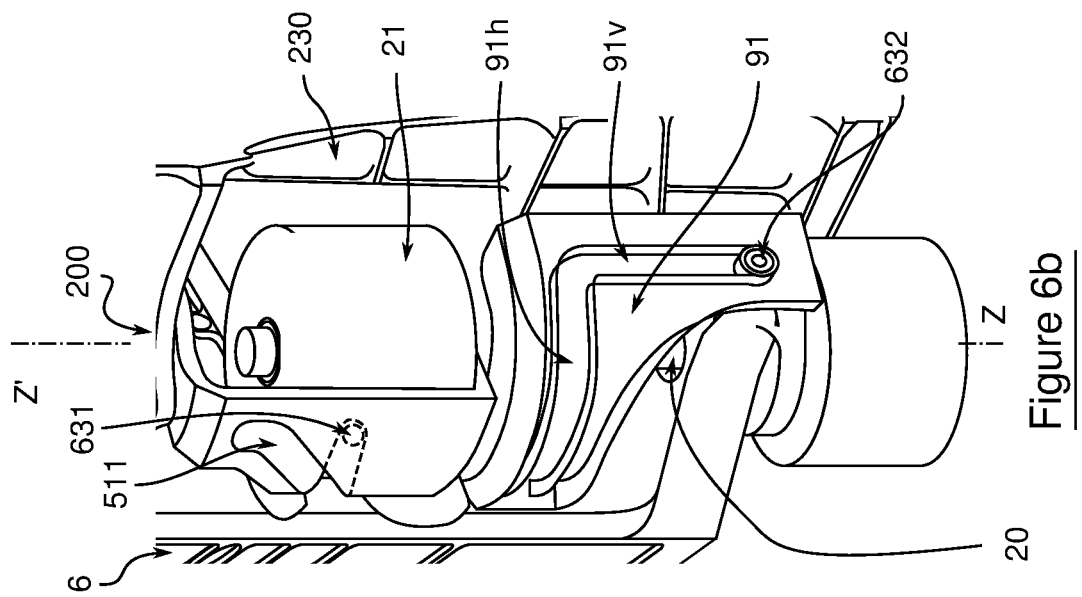
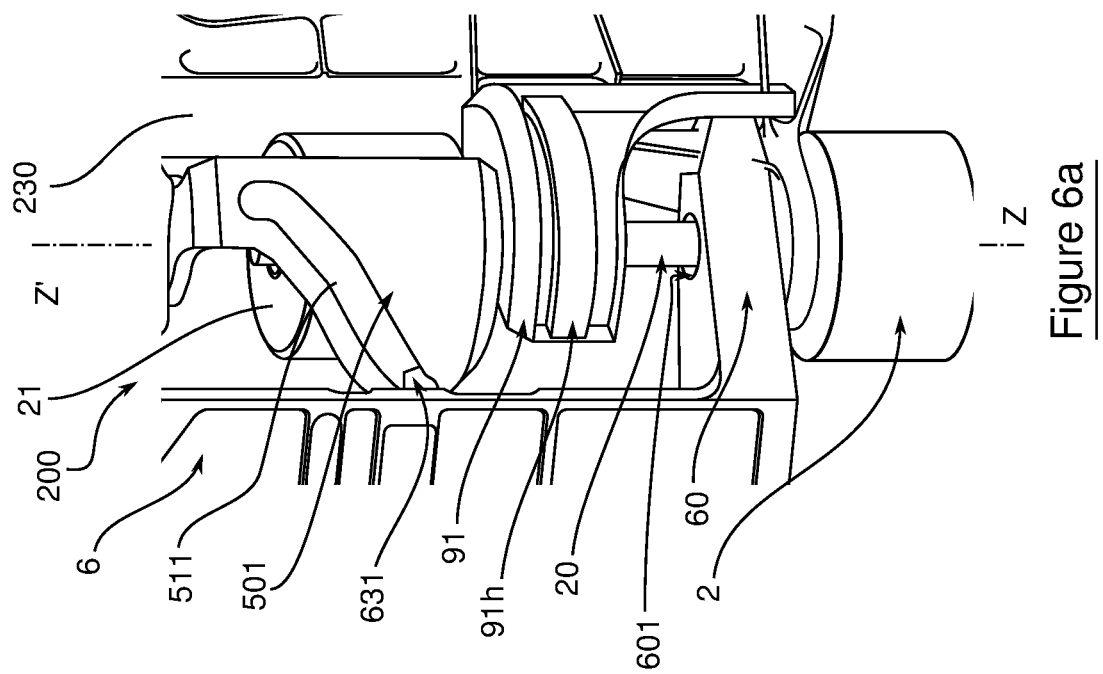

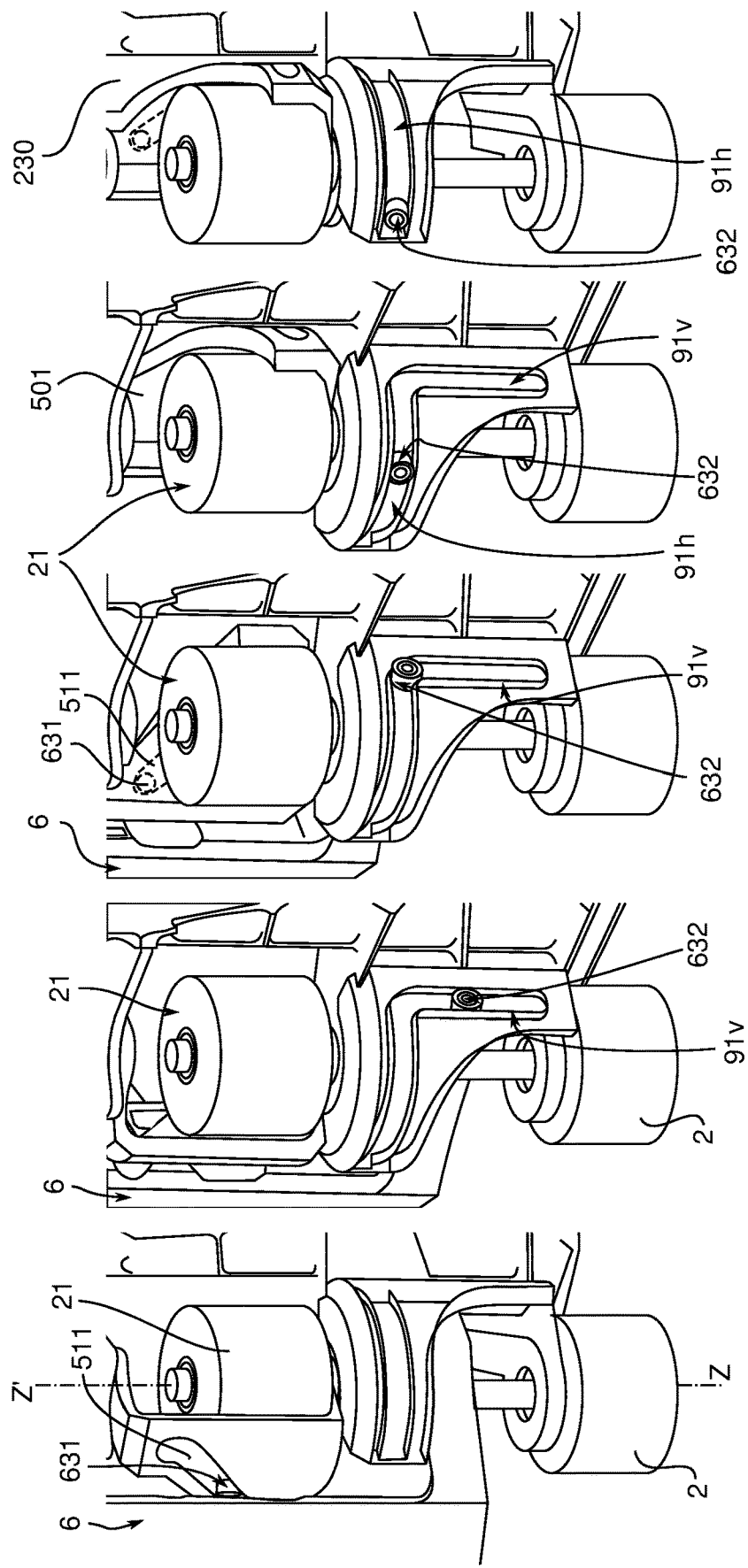

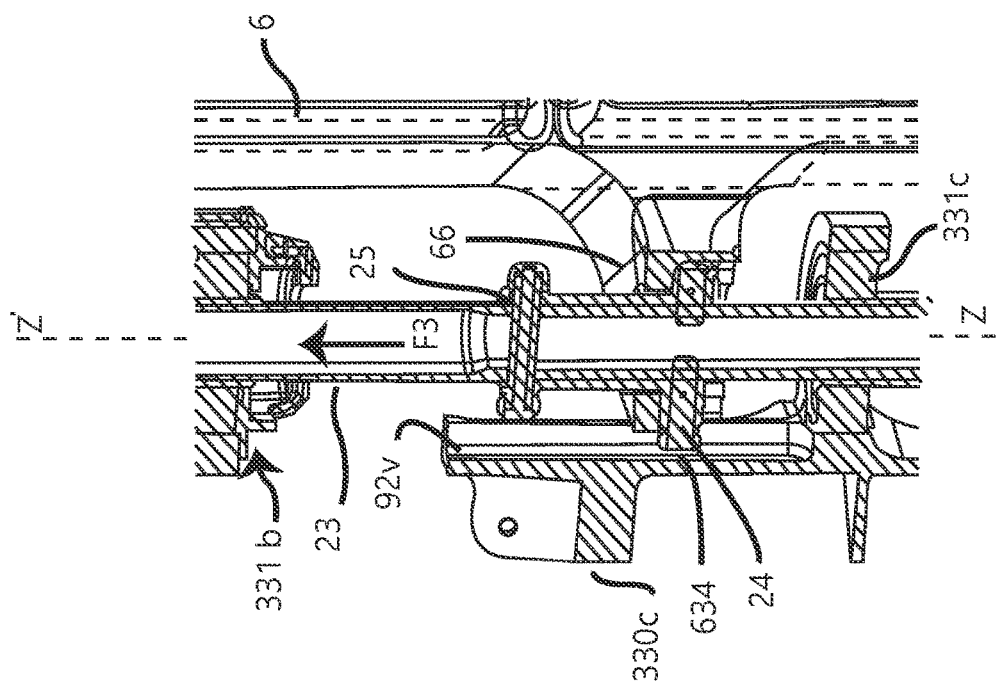
Figure 13b
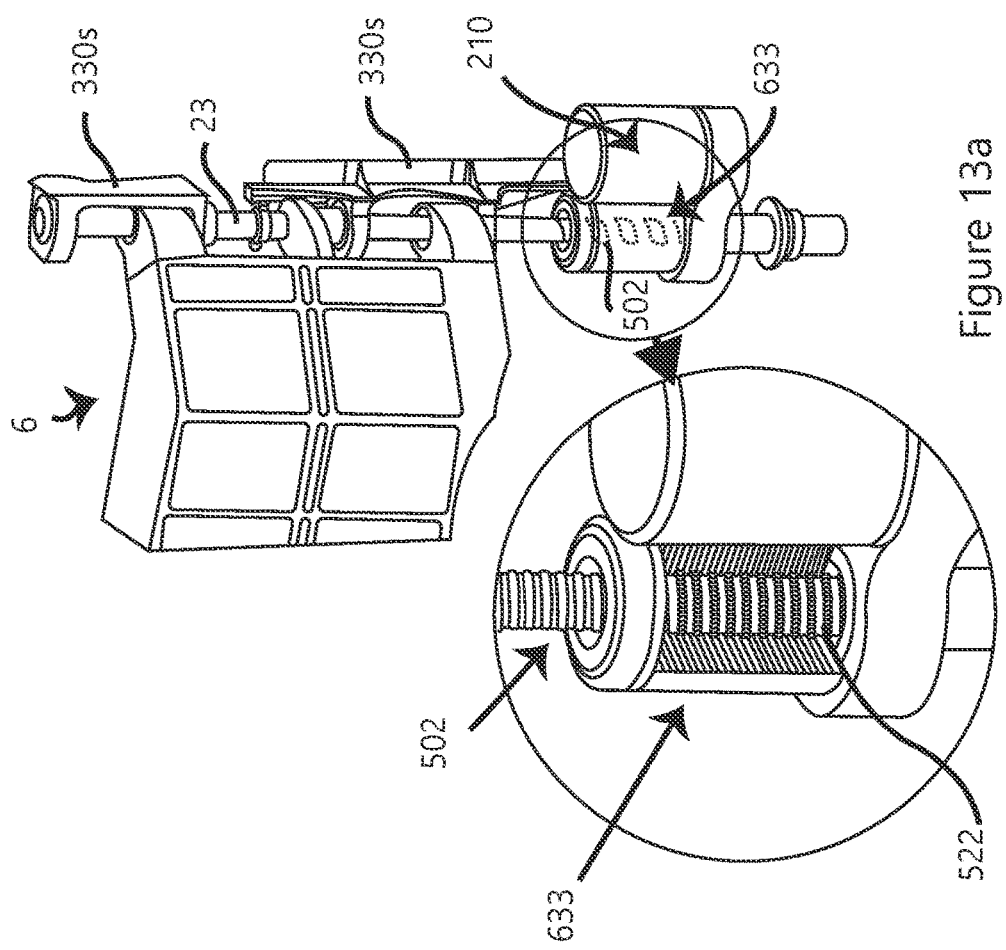
Figure 13a
Figure 13c

LOCKING AND MOVING SYSTEM FOR AN AIRCRAFT ELECTRIC DOOR

CROSS REFERENCE TO RELATED APPLICATION

This application is Continuation application of U.S. patent application Ser. No. 15/728,888 filed Oct. 10, 2017, issued as Mar. 26, 2019 as U.S. Pat. No. 10,240,383, which is based on U.S. patent application Ser. No. 15/728,888 filed Oct. 10, 2017, which is a divisional of U.S. Pat. No. 9,816,307 issued Nov. 14, 2017 based on U.S. application Ser. No. 14/443,080 filed May 15, 2015, which is a national stage entry of PCT/EP2013/003429 filed Nov. 14, 2013, under the International Convention claiming priority over French Patent Application No. 1260893 filed Nov. 16, 2012.

FIELD OF THE INVENTION

The invention relates to a method for opening/closing an aircraft electric door for a pressurized airframe, together with an electric door intended for implementing this method. This door can be a passenger door, a service door, a cargo door, in nominal or emergency use, or even an emergency exit door.

BACKGROUND OF THE INVENTION

The opening of an aircraft door can generally be broken down into several phases that succeed each other: unlocking and releasing the safety catch, lifting, pivoting and disengaging the door along the external side of the aircraft fuselage. In particular, triggering the lifting phase can enable the ice that may be present on the external side of the fuselage to be broken before continuing with opening the door through the pivoting and disengaging phases. For closing, the phases take place in the reverse order and according to inverse kinematics.

In emergency situations, it is necessary to be able to trigger door opening in a single operation. Due to operability constraints on airline personnel, the opening or closing force on the door actuation handle must be limited in normal utilization conditions and in emergency conditions.

In particular, slight icing of the door (for example, of the order of 2.5 mm thickness of ice on the fuselage) already causes opening difficulties, which does not allow an emergency evacuation of passengers in the safety conditions required in the event of evacuation to be performed. Heavy icing of the door (for example, of more than 6 mm thickness of ice) makes it difficult to open the door, which necessitates the intervention of several operators and causes a delay in disembarking the passengers.

The doors are therefore advantageously equipped with electric motors that will act to guarantee their opening through an appropriate supply of power. These motors control actuators that guide the door according to pre-established kinematics, with a lifting phase to break the ice on the exterior of the fuselage.

An aircraft electric door is known from the patent document EP 0 465 785, whose opening and closing kinematics are implemented by a dozen electric motors. These motors are digitally controlled to perform different functioning phases in a coordinated manner: pivoting, closing and locking, as well as the reverse functions.

The patent document U.S. Pat. No. 5,163,639 furthermore describes an aircraft electric passenger door equipped with two electric motors for controlling the operations: a motor for controlling the rotation of the door and a motor for controlling the means of opening/closing the door.

The electric door of the patent document EP 1 090 834 is also equipped with two electric motors actuated by a control and management unit. This unit transmits control signals to a first motor to lock/unlock and to lift a door lifting and (un)locking arm, and to a second motor to pivot the door and bring it to its final open position.

In critical emergency exit situations—fire risk, unsecured landing, serious technical problem—the door must be capable of releasing itself automatically from the fuselage after having actuated the handle. This actuation is generally provided by a pneumatic jack linked with a gas supply.

These solutions present major drawbacks with regard to safety, especially in cases of emergency opening, and more generally, with regard to the kinematics sequence. These problems are related to the coordination complexity between the motors in performing the different door opening/closing phases, and also to the presence of a pneumatic jack with its gas supply for activation in the event of an emergency. Moreover, breaking the external ice is not the subject of any special treatment in the motorized solutions.

SUMMARY OF THE INVENTION

The invention aims to remedy these drawbacks of the prior art by integrating the activation of the different phases of releasing the door and harmonizing its movements by means of a single electric motor, including the treatment of the external ice that may be present.

More precisely, the object of the present invention is a method for opening/closing an aircraft electric door for a pressurized airframe, passenger or service door, being driven by a single electric motor controlled by a door computer:

for opening the door, after disarming the toboggan, to successively link the sequential phases of unlocking, lifting and pivoting the door by unlocking the safety catch of the door by releasing locking means of a locking system;

electrically lifting the door with a door arm hinged on a vertical hinge mounted on the door, and, driven by the electric motor, with mechanically forced guidance along the vertical axis by preventing a horizontal rotational drive along the same axis;

releasing a horizontal guideway when the vertical guideway comes against the stop, then pivoting the door arm on a horizontal guideway along a cylindrical surface of a vertical axis of rotation in order to disengage the door along the external aircraft fuselage;

for closing the door, to rotate the door arm and the door in the reverse direction to that for opening, by horizontal guidance along the cylindrical surface, to stop the horizontal guidance for pivoting the door arm when this guidance comes to the stop, then of lowering the door arm and the door 1, with mechanically forced guidance along the vertical axis by preventing the rotational drive.

The door can be opened just as well from the exterior as from the interior of the aircraft, after disarming the toboggan and unlocking the safety catch, by lifting the door with the door arm then by rotating the door arm.

According to preferred implementations:

lifting is initiated by an accelerated phase using a lever for multiplying from a few millimeters to about ten millimeters that produces a sufficiently high force to break the ice that may have formed on the aircraft, between the perimeter of the door and the fuselage;

the door computer manages the movements of the door according to the information transmitted by all of the position sensors fitted opposite the rotating parts equipped with roller bearing Hall effect tracks;

in the event of an emergency, the unlocking of the door safety catch is triggered in a single operation by actuating an internal handle, which, through detection of its movement, transmits an unlocking signal to the door computer.

The invention also relates to an aircraft electric door for a pressurized airframe, namely a passenger or service door, comprising a locking system provided with means for locking a safety catch and a system for coordinating door movements having a single electric motor driving a mobile cylindrical support having a vertical rotation axis, managed by a door computer, and a fixed guide, the mobile support and fixed guide being intended to control and coordinate the movement of the door arm. The support has at least one guideway linked with the arm, this guideway being at least partially helical along the vertical axis of the support. The door arm is capable of pivoting around a vertical hinge and is linked with door lifting means mounted between a shaft of the safety catch and the door arm. The fixed guide, likewise cylindrical with a vertical axis, possesses at least one double, vertical and horizontal, camway for guiding the arm successively in these two directions, respectively to prevent it from lifting vertically and then to pivot it.

According to preferred embodiments:

at least one lifting slider is associated with a lifting ramp of the door in order to form at least one lever for multiplying the initiating force for lifting the door in order to break the ice that may have formed on the aircraft, between the perimeter of the door and the fuselage;

a triggering device, internal or external to the aircraft, is capable of actuating the unlocking of the safety catch, the triggering device includes a handle (4) associated with a detection sensor (C1) for detecting the end of travel of the handle (4) and a push-button triggering an electrical signal linked with the door computer;

position sensors are fitted opposite the rotating parts equipped with roller bearing Hall effect tracks and are linked with the door computer in order to transmit position information about these parts;

in the event of an emergency opening, only the internal handle is capable of directly triggering the unlocking of the safety catch, this triggering being provoked by a signal from a sensor situated at the end of travel of the handle;

a multiplying lifting lever is placed at each extremity of the safety catch shaft;

the horizontal camway (9*h*) of the fixed cam (9) is a raised edge of a support in order to keep the door lifted and to prevent it from lowering;

the means of locking the safety catch comprise locks mounted on a lock shaft and associated with counter-locks mounted on the safety catch shaft, the locking link between the locks and the counter-locks being released by the triggering means;

the cylindrical support is a sleeve, rotationally mobile, comprising a camway formed from a helical portion, globally slanting, linked with a guiding slider coming from the door arm; and the sleeve is surrounded by a cylindrical cam support, forming the fixed guide having a double, vertical and horizontal, camway linked with the same guiding slider;

the mobile cylindrical support is a sleeve rotated by the motor via a vertical column, this sleeve comprising a camway formed from a helical portion, globally slanting, linked with a guiding slider coming from the door arm; and the fixed guide is constituted from a second sleeve coaxial with the first sleeve, forming the double, vertical and horizontal, camway linked with a second guiding slider coming from the door arm via a hinge arm with the motor vertical column passing through it;

the vertical column is driven by a reducing gear associated with the electric motor;

the cylindrical support is a screw rod rotated by a back-geared motor via a nut mounted on the rod, this threaded rod forming a helical guideway; and the fixed guide is constituted from a guideway sleeve coaxial with the rod and a hinge plate coming from a fuselage fitting. This sleeve forms a camway, vertical and horizontal, linked with a guiding slider coming from the rod, and the hinge plate forms a horizontal camway linked with another slider coming from the rod;

the threaded rod is a rod with balls in the threads and the nut is a ball nut.

In this text, the term "slider" designates both a bearing part such as a roller, rotationally mobile as it moves in a camway or slide, and a non-rotating finger moving in translation in a camway or a slide. The term "motor" or electric motor includes the driving motors used in the field, the motors associated with reducing gears and back-geared motors.

BRIEF DESCRIPTION OF THE DRAWINGS

Other data, characteristics and advantages of the present invention will emerge on reading the non-limited description that follows, with reference to the attached figures, which show, respectively:

FIG. 4*a* shows a side view of the door lifting lever and safety catch showing the shaft in the locked position relative to safety catch ramps;

FIG. 4*b* shows side view of the door lifting lever and the safety catch shaft showing the rollers and safety catch shaft unlocked FIG. 4*c* shows a side view of the door lifting lever and the safety catch shaft showing the door lifted to the upper position;

FIG. 5*a* shows a front perspective view of the door arm pivoting operation when the door is in the upper position at the end of the lifting operation;

FIG. 5*b* shows the door arm pivoting operation when the door is in the closing position;

FIG. 5*c* shows a partial sectional view of the door arm pivoting operation showing a set of coaxially rollers;

FIG. 6*a* shows a perspective view along a first viewing angle of the door in the closed position, the door being equipped with a second example of a system for coordinating movements with two door movement rollers;

FIG. 6b shows a perspective view along a second viewing angle of the door in the closed position, the door being equipped with a second example of a system for coordinating movements with two door movement rollers;

FIG. 7a shows, a first perspective view along the first viewing angle of the door in the intermediate lifting position, the door being equipped with the second example of a system for coordinating movements;

FIG. 7b shows, a first perspective view along the second viewing angle of the door in the intermediate lifting position, the door being equipped with the second example of a system for coordinating movements;

FIG. 8 shows a perspective view of the door in the lifted position, the door being equipped with said second example of a system for coordinating movements;

FIG. 9 shows a perspective view of the door in the intermediate position during its horizontal pivoting rotation, the door being equipped with said second example of a system for coordinating movements;

FIG. 10 shows a perspective view of the door in the final open position after its horizontal pivoting rotation, the door being equipped with said second example of a system for coordinating movements;

FIG. 13a shows a perspective view of the third example with the door ready-to-lift position;

FIG. 13b shows a vertical sectional view in the plane of symmetry of the third example with the door ready-to-lift position;

FIG. 13c shows a detailed view of the threaded rod 502 with balls in the threads and the ball nut;

DETAILED DESCRIPTION OF THE INVENTION

Figure 1:
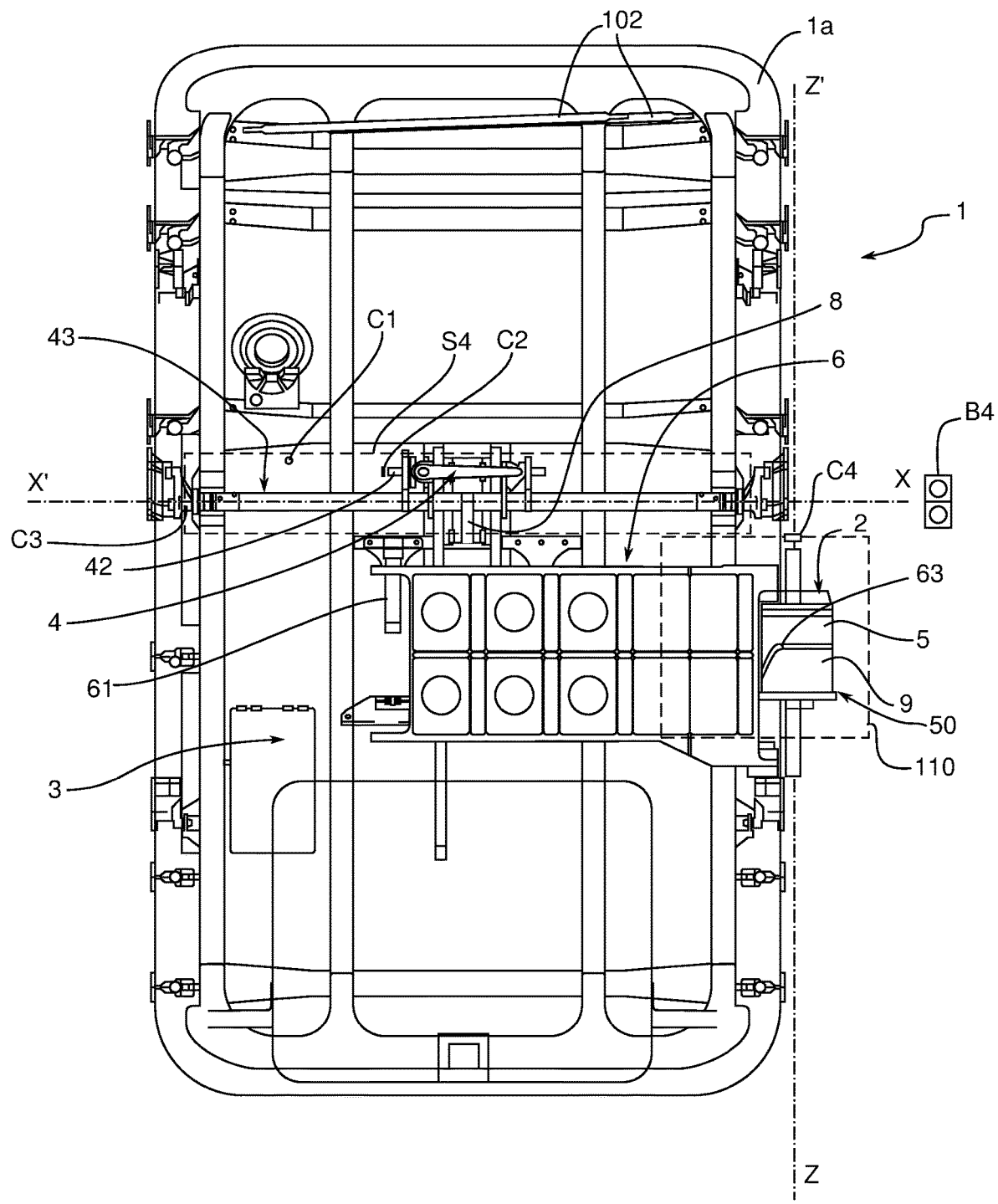
FIG. 1, an overall view of the internal side of an aircraft door equipped with an example of a system for coordinating door movements according to the invention, implementing a set of door movement rollers.

In all of this text, the qualifiers "vertical" and "horizontal" (and their derivatives), relative to the position of items in use, refer to the direction of the Earth's gravity, in relation to land or on water, and to a plane perpendicular to this direction. Furthermore, identical reference characters on the figures refer to the same items with the same functions and the paragraphs that describe them.

With reference to FIG. 1, which illustrates an overall view of the internal side 1a of an example of an aircraft door 1 for passengers according to the invention, a single actuating electric motor 2 is managed by a digital control data processing unit 3, known by the name "door computer". An internal locking handle 4 allows a locking system S4 to be released. A sensor C1 is placed at the end of travel of the handle 4 in order directly to trigger the starting of the motor 2 in the event of an emergency opening. In normal conditions, this starting is triggered by a dual push-button B4 of the "on/off" (open/closed) type.

The electric door likewise comprises a system for coordinating movements 110, vertical lifting movement and horizontal door pivoting movement. This system 110 comprises the single actuating electric motor 2, a cylindrical sleeve 50 having a vertical rotation axis Z'Z, intended to be rotated by the motor 2, and a fixed cam 9.

The electric motor 2 is likewise linked with a mobile cam 5 formed in the cylindrical sleeve 50 having the vertical rotation axis Z'Z. This mobile cam 5 is intended to perform the lifting of the door 1 and its pivoting. It has a guideway, called the camway 51, of a door arm 6. The arm 6 is hinged on a vertical hinge 61 mounted on the door 1, in order to pivot the door 1 around the fuselage (see the description referring to FIGS. 5a and 5b). The door arm 6 thus remains free in vertical translation along the axis Z'Z. In particular, during the flight phases, the arm 6 is not loaded by the weight of the door 1.

This arm 6 is furthermore linked, in axial rotation along the axis X'X, with a central linking lever 8, itself linked in axial rotation on a safety catch shaft 43.

A fixed cam 9 fitted in a cylindrical sleeve around the sleeve 50 of the mobile cam 5 is likewise intended to guide the door arm 6 in two directions. FIGS. 3a to 3c and 5a to 5c will more accurately illustrate these guideways in two directions.

Moreover, a set of guide links 102 is provided on the upper part of the door 1 in order to ensure circular translation when the door opens.

Figure 2:
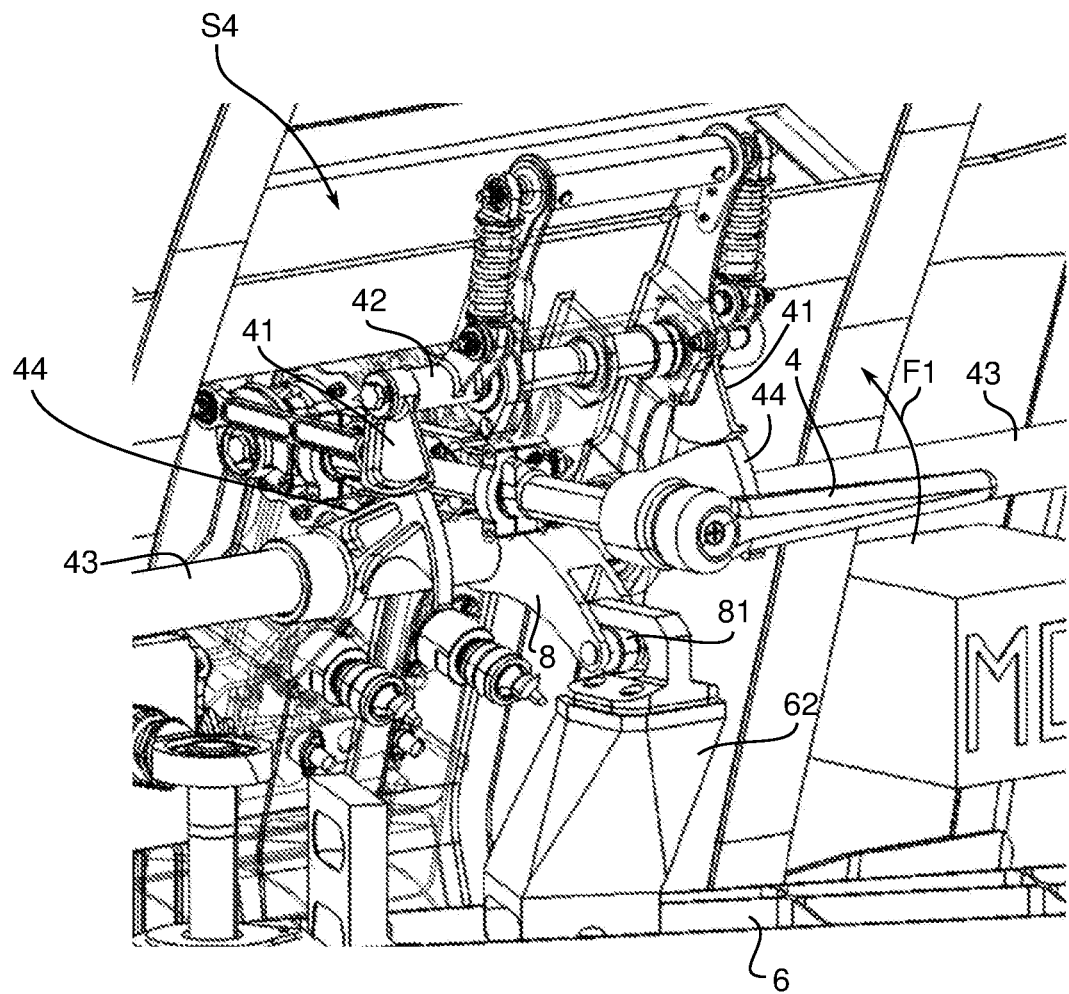
FIG. 2, a perspective view of the locking system for the safety catch of the preceding example.

The perspective view of FIG. 2 is a detailed illustration of the locking system S4 of the safety catch.

In this system, a lifting action (arrow F1) through 180 degrees of the internal safety handle 4 (or the actuation of the push-button B4 of FIG. 1) unlocks the safety catch consisting of the tight contact of locks in the form of locking stops 41 of a lock shaft 42 against counter-locks 44 of the safety catch shaft 43. The shaft 43 is then electrically released from the stop 41 by rotation of the lock shaft 42. The shaft (43) is driven by the motor 2 actuated by the door computer 3 (see FIG. 1).

The rotation of the shafts 42 and 43 is detected and electronically monitored by position sensors C2 and C3 (FIG. 1), respectively fitted opposite an extremity of the shafts 42 and 43. These sensors receive a variable induction emitted by Hall effect tracks integrated in the shaft bearings. The sensor C3 send the angular position of the shafts 42 and 43 to the door computer.

More generally, the computer manages the movements of the door according to the information transmitted by all of the position sensors fitted opposite the rotating parts, especially—in the illustrated example—opposite the sensors of the shafts 42 and 43 and also that of the motor column (see below).

This figure also shows the linking lever 8 mounted to rotate axially on a lever roller 81 arranged in a fitting 62 linking with the door arm 6.

Figure 3C:
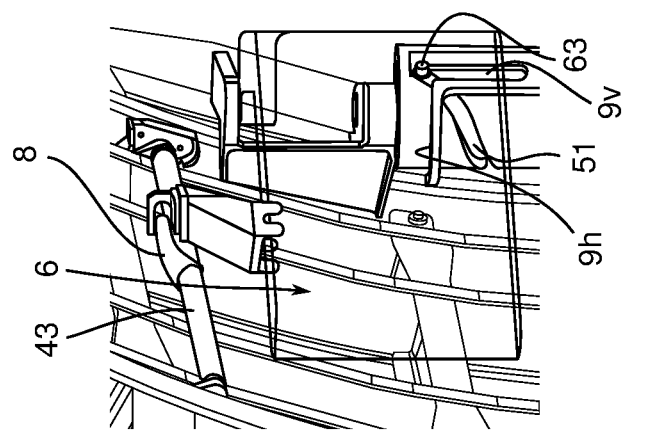
FIG. 3*c* shows a perspective front view of the locking system for the safety catch of FIG. 2 showing the roller reaching the upper extremity of the camway.
Figure 3B:
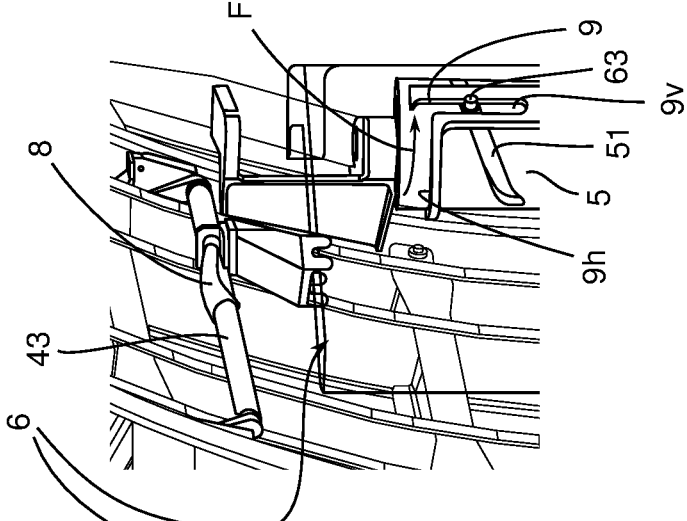
FIG. 3*b* shows a perspective front view of the locking system for the safety catch of FIG. 2 showing the roller vertically raised.
Figure 3A:
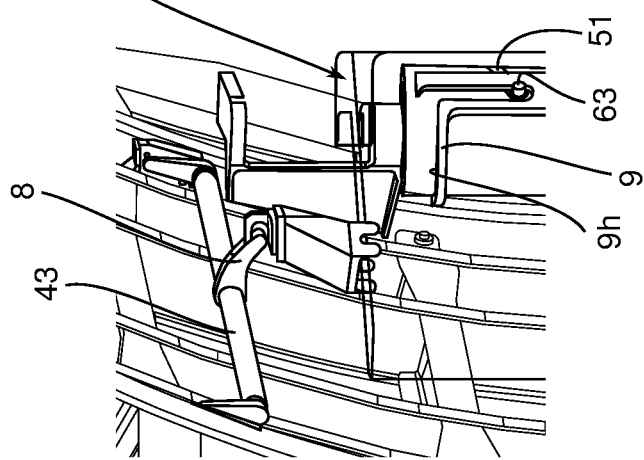
FIG. 3*a* shows a perspective front view of the locking system for the safety catch of FIG. 2 in which the safety catch is unlocked but the safety catch shaft remains in the "door closed" position.

The lifting operation of the door arm, which starts door opening, is illustrated by the perspective views of FIGS. 3a to 3c. In these figures (and also in FIGS. 5a to 5c), the door arm 6 appears as transparent in order to avoid masking the components situated behind.

The end of unlocking the safety catch (43), described above, transmits, via the door computer 3, a command to the electric motor 2 to rotate the mobile cam 5 of vertical axis of rotation Z'Z. To do this, the angular position of the lock shaft 42 is detected, for example by the Hall effect sensors of the lock shaft 42.

For this lifting operation, a traveler, presented in the example as a set 63 of coaxial rollers coming from the door arm 6, is positioned in the helical and globally slanted camway 51 formed on the sleeve 50. The roller 63 is likewise inscribed in a vertical guideway called the camway 9v of the fixed cam 9.

With reference to FIG. 3a, in which the safety catch is unlocked but the safety catch shaft 43 remains in the "door closed" position, the roller 63 is simultaneously placed at the low extremity of the slanted camway 51 and the vertical camway 9v.

After actuation of the rotation of the cam 5 (arrow F2) by the electric motor 2 and unlocking of the safety catch shaft 43 (see the later passage referring to FIG. 4b), the roller 63 rises in the slanted camway 51 of the mobile cam 5, and also in the vertical camway 9v of the fixed cam 9 (see FIG. 3b). This vertical camway 9v being fixed, the roller 63 rises vertically in the direction Z'Z and, in this rise, drives the door arm 6, which therefore likewise rises vertically. The linking lever 8 is then axially rotated by the door arm 6, and releases the safety catch shaft 43 from its locked position.

The door arm 6 likewise drives a vertical lifting of the door 1, and this lifting continues until the roller 63 (FIG. 3c) reaches the upper extremity of the slanted camway 51 and that of the vertical camway 9v.

Respectively at the same moments when the views of FIGS. 3a to 3c were taken, FIGS. 4a to 4c illustrate more accurately, in side views in the frame 100 of the door 1, the rotation of safety catch levers 4a placed at the extremities of the safety catch shaft 43 in the aim of unlocking the safety catch shaft 43. In FIG. 4a, the shaft 43 is in the locked position relative to safety catch ramps 4b and to unlocking rollers 40 fitted on the safety catch levers 4a. Unlocking the rollers 40 at the same time releases the safety catch shaft 43 (FIG. 4b). The rotation of the linking lever 8 then rotates the safety catch levers 4a. In FIG. 4c, the door is lifted to the upper position, this lift corresponding to that of the linking fitting 62.

During this rotation, lifting rollers 7a, mounted at the extremity of the safety catch shaft 43, bear against lifting ramps 7b, which allows a significant lifting force to develop, in order if necessary, to break the ice covering the external skin of the aircraft (FIGS. 4b and 4c). The moment exerted by the short lever arm formed between the rollers 7a and the ramps 7b supplies a large force, which, guided by the lifting ramp 7b, increases the lifting force: the door is raised by a few millimeters with a force sufficient to break, mainly by shearing, the ice localized between the perimeter of the door and the fuselage.

With reference to FIGS. 5a and 5b, which illustrate the pivoting operation of the door 1 when the door 1 is in the upper position at the end of the lifting operation (as illustrated by FIG. 3c), the cam 5 continues to turn (arrow F2). The set of coaxial rollers 63, which abut the extremity of the slanted camway 51, is no longer guided by the vertical camway 9v. Driven by the sleeve 50, it turns with the latter around the vertical axis Z'Z, while still bearing against a horizontal guideway, called the camway 9h, of the cam 9. This rotation causes that of the door arm 6, pivoting around the hinge 61 of the door 1 (see FIG. 1) and move forward towards the aircraft fuselage.

The partial sectional view of FIG. 5c more particularly illustrates the installation of the rollers 63a and 63b constituting the set 63. The rollers 63a and 63b are mounted coaxially on a single axle 6x.

For door closing, the operations of door pivoting, door lowering, safety catch locking and immobilizing, take place in the reverse order through a control of the motor 2 in inverse rotation and through closing the internal safety handle 4 (FIG. 1).

A second embodiment of a system for coordinating door movements with two separate rollers is illustrated in FIGS. 6a to 10. FIGS. 6a and 6b show two complementary perspective views of this system 200 in the door closed position. These complementary views 6a and 6b, and also views 7a and 7b described below, make it possible to illustrate the relative positions of the rollers.

In this second embodiment, the camway sleeves are separate: the coordination system 200 comprises a mobile cylindrical sleeve 501, mounted on the vertical column 20, which is rotated by the motor 2 via a reducing gear 21, and a fixed cylindrical sleeve 91 coaxial with the mobile sleeve 501 along the axis Z'Z. The rotation of the column 20 is monitored by a Hall effect sensor C4 (FIG. 1), as are the lock shaft 42 and the safety catch shaft 43.

The mobile sleeve 501 comprises a camway 511 formed from a helical portion, globally slanted on the axis Z'Z, linked with a first door movement guide roller 631 coming from the door arm 6.

The fixed sleeve 91, coaxial with the first sleeve 501, furthermore forms a double camway 91h and 91v, respectively vertical and horizontal, linked with a second door movement guide roller 632. This second roller 632 comes from the door arm 6 via a lower yoke in which a bore 601 has been made such that the vertical column 20 of the motor can pass through it.

The complementary perspective views of FIGS. 7a and 7b illustrate an intermediate lifting position of the door arm 6 (and therefore of the aircraft door). In FIG. 7a, the first roller 631 appears to move forward in the slanted camway 511, this camway rotating around the vertical axis Z'Z. Because the second roller 632 is vertically guided in the camway 91v (FIG. 7b), the first roller 631 can only move likewise in a vertical movement when it travels the slanted camway 511.

With reference to the perspective view of FIG. 8, the rollers 631 and 632 are at the upper stops of the camways 511 and 91v. The door arm 6 (and therefore the aircraft door), is then in the upper lifting position.

As illustrated by the perspective view of FIG. 9, the first roller 631 is then driven in rotation around the axis Z'Z by the reducing gear 21 via the mobile sleeve 501. In fact, the second roller is simultaneously guided through the horizontal camway 91h, which extends as a continuation of the vertical camway 91v.

During this rotation, the door arm 6 pivots and FIG. 9 illustrates the arm 6 in the intermediate pivoted position. When the second roller 632 has reached the stop of the horizontal camway 91h (FIG. 10), the door arm 6 has fully pivoted and the door is fully disengaged along the external skin of the fuselage.

A third embodiment of the system for coordinating movements of doors with rollers and with ball rods is illustrated in FIGS. 11 to 15b.

Figure 11:
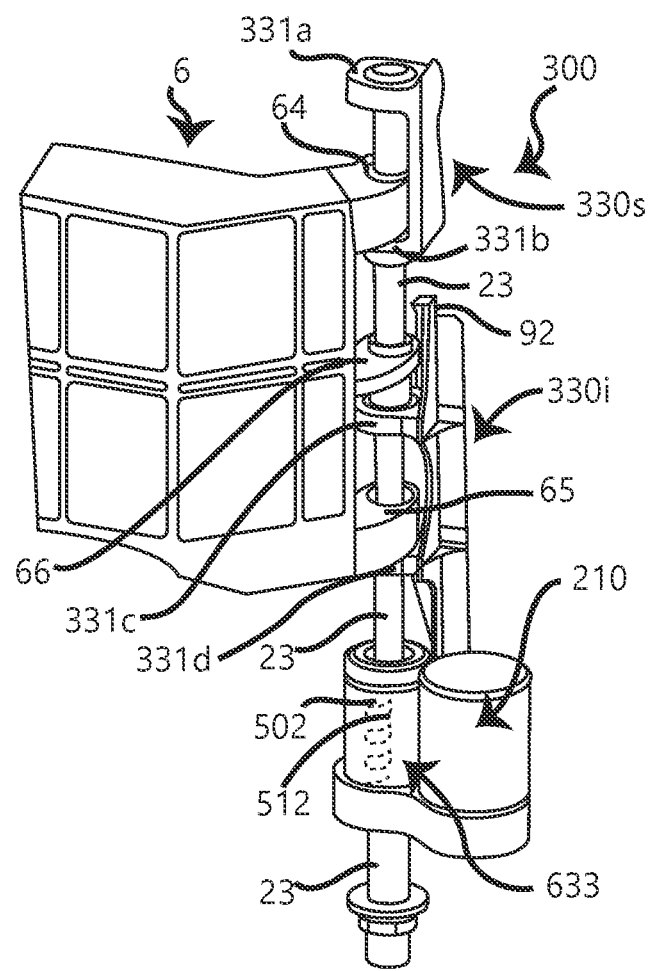
FIG. 11, a perspective view of a third example of a system for coordinating movement of an aircraft door having two rollers and a ball rod according to the invention, the door being in the closed position.

In the perspective view of FIG. 11, the system for coordinating movements 300 corresponds to the position of the door arm 6 when the door is closed. This coordination system 300 comprises a vertical rod 23, forming a threaded rod 502 with balls 522 in the threads, and a fixed guideway sleeve 92 coaxial with the rod 23. The coordination system 300 rests on fittings 330s and 330i via cylindrical hinge plates: two upper hinge plates 331a and 331b linked with an upper fitting 330s, an intermediate hinge plate 331c and a lower hinge plate 331d linked with a lower fitting 330i. The sleeve 92, which is part of the lower fitting 330i, has the intermediate hinge plate 331c as its base.

The rod 23, intended to be rotated by the back-geared motor 210, forms a helical guideway 512 linked with a ball nut 633 for lifting the door arm 6.

Also illustrated in FIG. 11 are the upper and lower hinge yokes 64 and 65 for rotationally mounting the door arm 6 on the rod 23, and also an intermediate yoke 66. These yokes are mounted on guide rings (not illustrated).

Figure 12C:
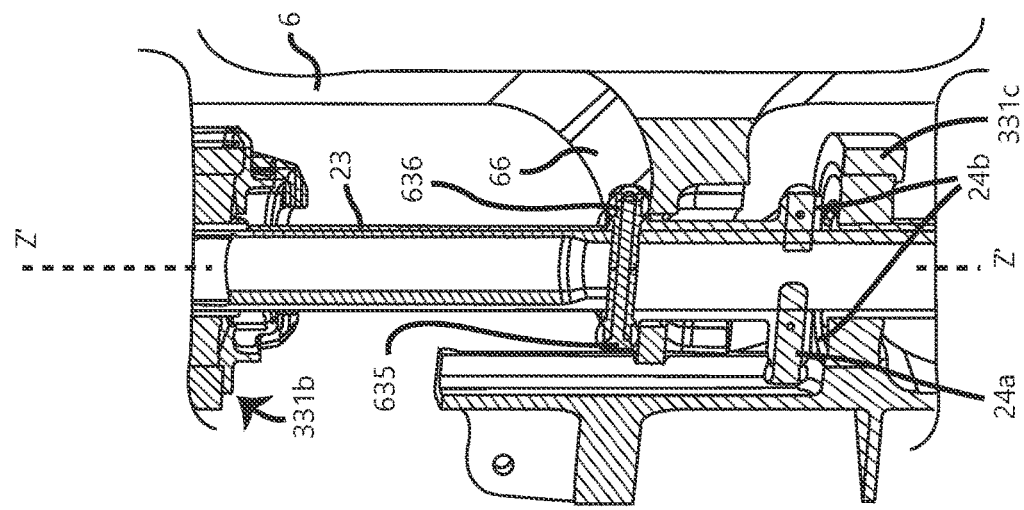
FIG. 12c shows a vertical sectional view in a plane of symmetry of the third example of a system for coordinating movements, in the initial door closed position.
Figure 12B:
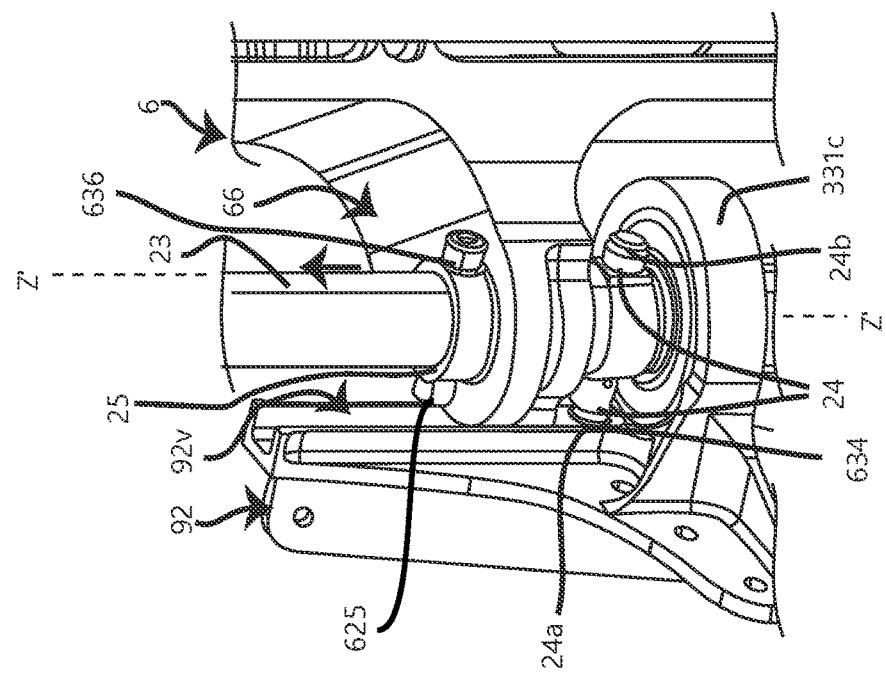
FIG. 12b shows a detailed perspective view of the third example of a system for coordinating movements, in the initial door closed position.
Figure 12A:
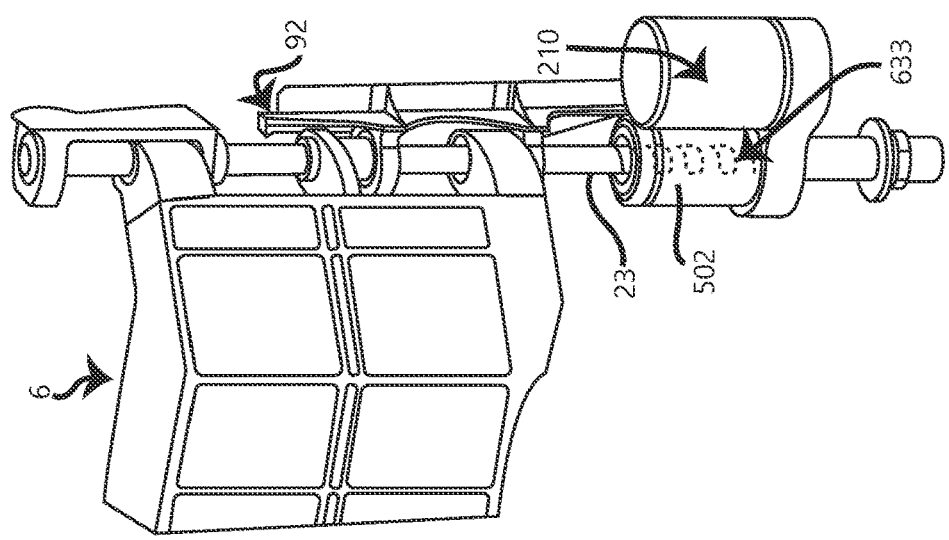
FIG. 12a shows an overall view in a plane of symmetry of the third example of a system for coordinating movements, in the initial door closed position.
Figure 14B:
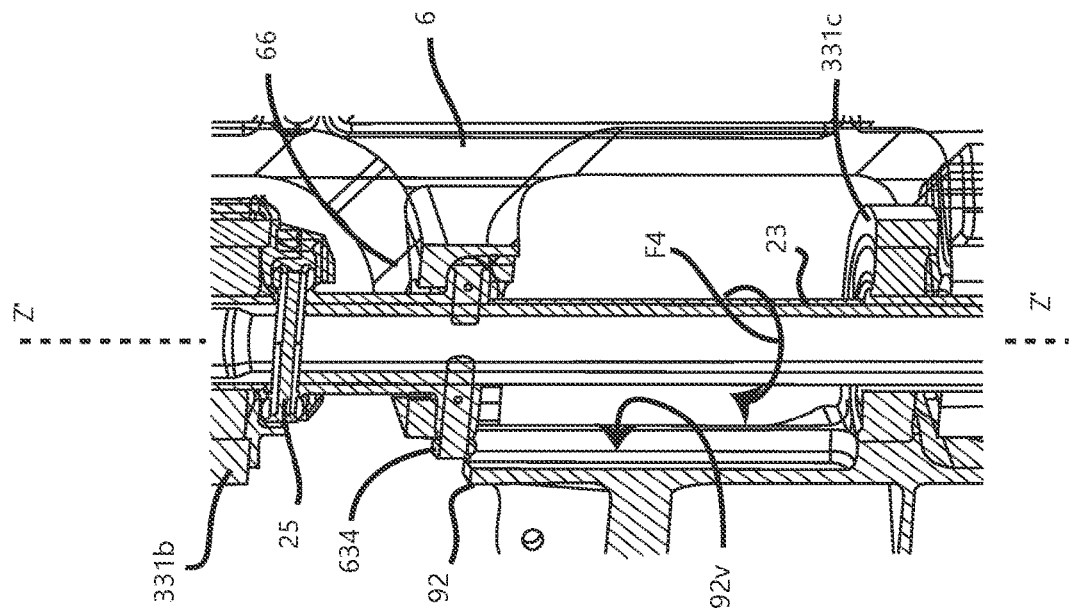
FIG. 14b shows a vertical sectional view in the plane of symmetry of the third example in the position of door lifted to the upper position.
Figure 14A:
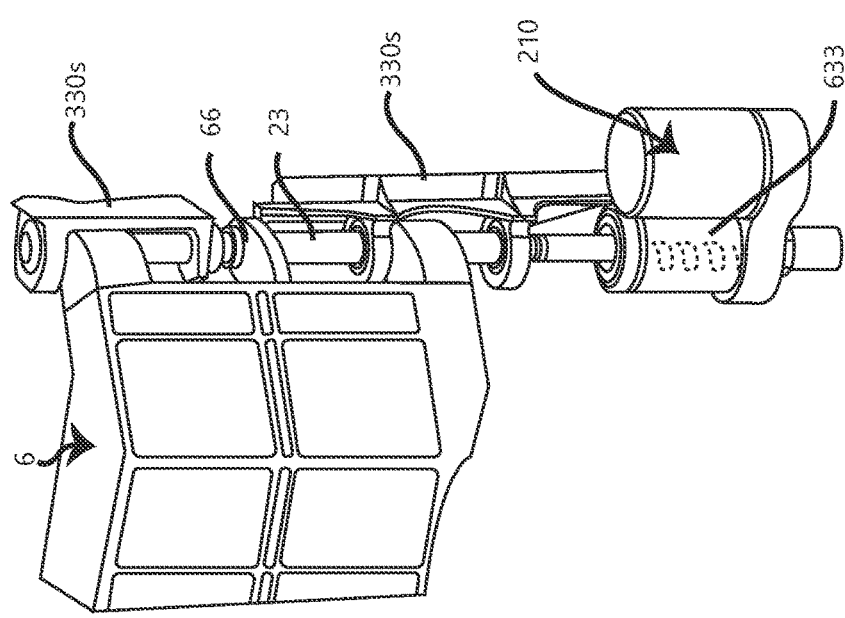
FIG. 14a shows a perspective view of the third example in the position of door lifted to the upper position.

With reference to the perspective and sectional views of FIGS. 12a to 12c, which illustrate the door arm 6 in the initial door closed position, the ball nut 633 appears to be mounted around the rod 502 of the rod 23. The nut and rod 502 with balls 522 in the threads assembly forms a rotation system around the rod 23 that is virtually devoid of any friction.

The fixed sleeve 92 of the intermediate fitting 331c comprises a vertical camway 92v (FIGS. 12b and 12c). This vertical camway 92v is devoted to a guide roller 634 mounted on a portion 24a of a transverse rod 24, consisting of two coaxial portions 24a and 24b, and integral with the rod 23. This transverse rod 24 is made to lift the door arm 6 vertically via the intermediate yoke 66. Another upper transverse rod 25, mounted above the intermediate yoke 66 of the door arm 6, passes through the rod 23. This upper transverse rod 25 is terminated by two rollers 635 and 636 mounted to turn around this transverse rod 25.

After the back-geared motor has been triggered by the push-button B4 or by the sensor C1 (FIG. 1), the rod 23 is driven in translation in the direction of lift (arrow F3) along the axis Z'Z, via the ball nut 633 linked with the threaded rod 502 (FIG. 12a). The perspective and sectional views of FIGS. 13a and 13b illustrate a position of the rod 23 ready to lift the door arm.

From the initial door closed position (FIGS. 12a to 12c) to the position of the rod 23 ready to lift the door (FIGS. 13a and 13b), the rod 502 is mechanically prevented from rotating by the vertical guidance imposed by the roller 634 moving in the vertical camway 92v of the fixed sleeve 92. In the ready-to-lift position (FIGS. 13a and 13b), the transverse rod 24 has become embedded in the intermediate yoke 66 in order to lift it vertically. The transverse rod 25 lifts with the rod 23.

Such a vertical lifting of the door (still according to the arrow F3 along the axis Z'Z), via the intermediate yoke 66 of the door arm 6, finishes at the door lifting position called upper. This position is illustrated by the perspective and sectional views of FIGS. 14a and 14b. At this stage, the roller 634 has exited the vertical camway 92v of the fixed sleeve 92, and coaxially along the vertical axis Z'Z, the upper transverse rod 25 has become embedded in the upper hinge plate 331b.

Figure 15B:
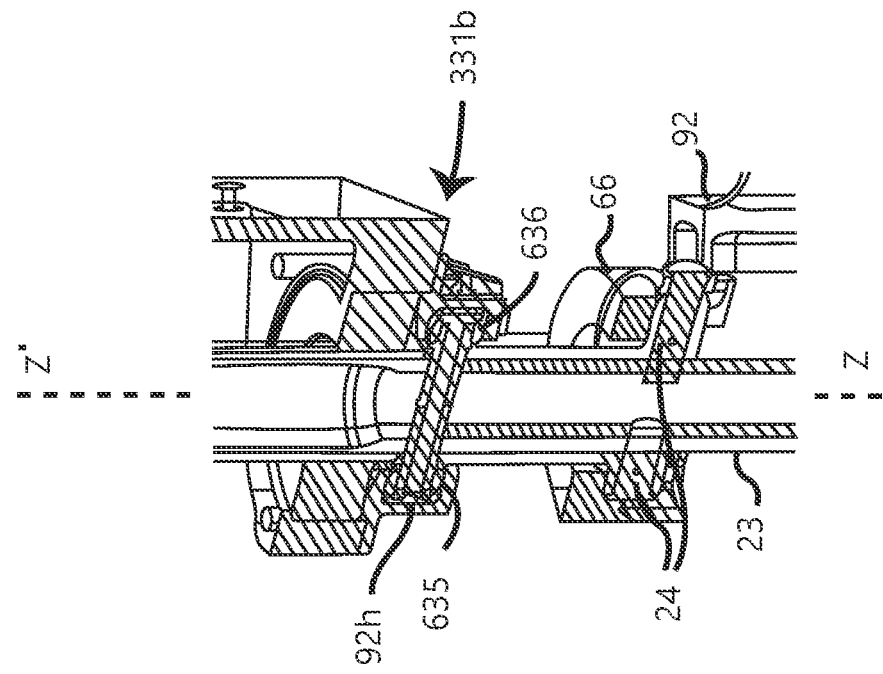
FIG. 15b shows a sectional view in the plane of symmetry of the third example, in rotation around the vertical axis, in order to pivot the door to the open position.
Figure 15A:
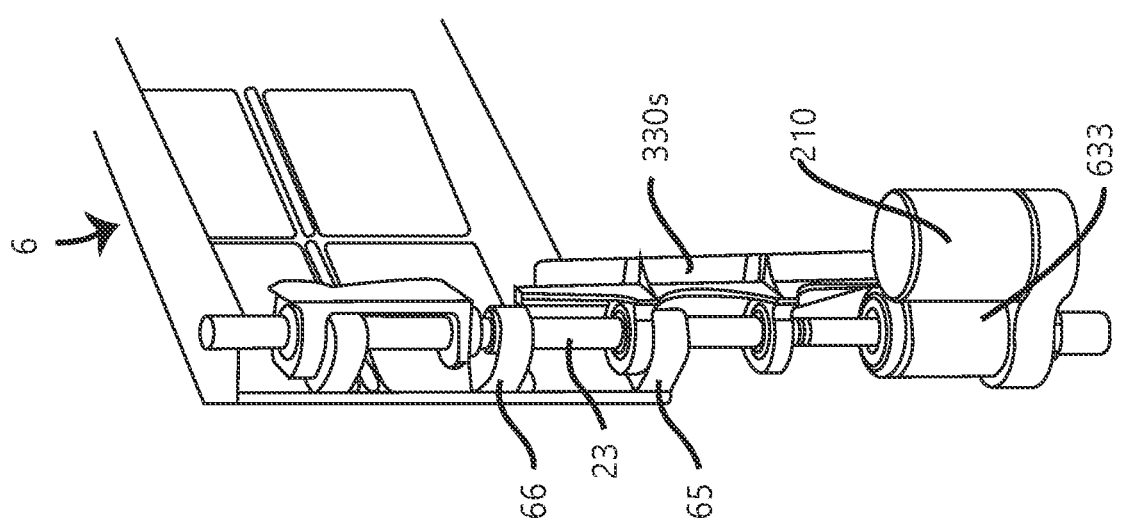
FIG. 15a shows a perspective view in the plane of symmetry of the third example, in rotation around the vertical axis, in order to pivot the door to the open position.

With reference to the perspective and sectional views of FIGS. 15a and 15b, the movements coordination system 300 is in the rotation phase for pivoting the arm 6 and opening the door along the external skin of the aircraft fuselage.

During this phase, the exit of the roller 634 from the vertical camway 92v (FIGS. 14a and 14b) releases the rotational drive (arrow F4) of the rod 23 through the nut 633. Until then, this rotation was mechanically prevented by the vertical camway 92v. The rollers 635 and 636 then move in a horizontal camway 92h formed in the upper hinge plate 331b (FIG. 15b). The vertical translation along the axis Z'Z is then blocked by the hinge plate 331b. Furthermore, the lower transverse rod 24 is likewise driven in horizontal rotation in a toric groove provided in the intermediate yoke 66.

The invention is not limited to the embodiment examples described and illustrated. A battery can therefore be provided to supply electrical energy if the on-board network is no longer capable of supplying electrical current, especially in the event of an emergency. It is moreover possible to provide a substitute manual device to open the door if neither the on-board network nor the battery is capable of supplying electrical current. Such a device is not directly accessible, so that it cannot be deregulated, and is connected directly to the motor or back-geared motor.

The airborne vehicle is usually an aircraft, but it could be a cargo airplane and, more generally, any flying machine capable of transporting passengers.

Several parallel camways can furthermore be formed on the sleeves, these camways and the corresponding sliders being vertically aligned in the vertical camway of the fixed cam.

The invention claimed is:

1. An aircraft electric door for a pressurized airframe comprising:
   a locking system for locking a safety catch;
   a moving system for opening and closing the door;
   an electric motor controlled by a door computer and adapted to actuate the locking system and the moving system;
   wherein the moving system includes:
      a vertical threaded rod connected to the door;
      a helical guideway linked to the door and including a ball nut connected to the vertical threaded rod;
   wherein the door is pivotally supported by a hinge, the hinge including an upper hinge plate with an upper fitting, a middle hinge plate and lower hinge plate;
   wherein the vertical threaded rod is rotatable by the electric motor;
   wherein the moving system is supported by the upper hinge plate, the middle hinge plate, and the lower hinge plate;
   wherein a guideway sleeve is located on the middle hinge plate, the guideway sleeve including a vertical camway engageable with a first guiding roller mounted on the vertical threaded rod, wherein the first guiding roller engages the vertical camway to prevent the door from rotating and enabling the electric motor to actuate the locking system and the upper hinge plate includes a horizontal camway engageable with a second guiding roller (635, 636) located on the vertical threaded rod, wherein the second guiding roller engages the horizontal camway to enable the electric motor to move the door between open and closed positions.

* * * * *